(12) United States Patent
Jerbi et al.

(10) Patent No.: US 8,660,047 B2
(45) Date of Patent: Feb. 25, 2014

(54) METHOD OF BROADCASTING DATA PACKETS IN A NETWORK OF MOBILE NODES AND ASSOCIATED TERMINAL

(75) Inventors: Moez Jerbi, Issy les Moulineaux (FR); Sidi-Mohammed Senouci, Lannion (FR); Yvon Gourhant, Lannion (FR); Yacine Ghamri-Doudane, Clichy (FR)

(73) Assignee: France Telecom, Paris (FR)

( * ) Notice: Subject to any disclaimer, the term of this patent is extended or adjusted under 35 U.S.C. 154(b) by 259 days.

(21) Appl. No.: 12/739,912

(22) PCT Filed: Oct. 17, 2008

(86) PCT No.: PCT/FR2008/051881
§ 371 (c)(1),
(2), (4) Date: Apr. 26, 2010

(87) PCT Pub. No.: WO2009/053657
PCT Pub. Date: Apr. 30, 2009

(65) Prior Publication Data
US 2010/0246470 A1 Sep. 30, 2010

(30) Foreign Application Priority Data
Oct. 26, 2007 (FR) ..................... 07 58615

(51) Int. Cl.
*H04H 20/71* (2008.01)

(52) U.S. Cl.
USPC ........... 370/312; 370/315; 370/338; 709/243; 709/244

(58) Field of Classification Search
USPC ......... 370/312, 315, 338, 397, 399, 406, 409, 370/11.1; 455/456.1; 340/902, 906; 709/239, 240, 241, 242, 243, 244
See application file for complete search history.

(56) References Cited

U.S. PATENT DOCUMENTS

| | | | |
|---|---|---|---|
| 7,613,165 B2* | 11/2009 | Shin et al. | 370/351 |
| 2004/0255001 A1* | 12/2004 | Oh et al. | 709/209 |
| 2005/0078678 A1* | 4/2005 | Kim et al. | 370/390 |
| 2005/0226201 A1* | 10/2005 | McMillin | 370/348 |

(Continued)

FOREIGN PATENT DOCUMENTS

| | | |
|---|---|---|
| DE | 198 49 294 | 4/2000 |
| WO | WO 2006/072850 | 7/2006 |
| WO | WO 2007/091219 | 8/2007 |

OTHER PUBLICATIONS

Abdelmalik Bachir ans Abderrahim Benstimane "A Multicast Protocol in Ad hoc Networks Inter-Vehicle Geocast" IEEE 2003, pp. 2456-2460.*

(Continued)

*Primary Examiner* — Michael Thier
*Assistant Examiner* — Awet Haile
(74) *Attorney, Agent, or Firm* — Knobbe Martens Olson & Bear LLP

(57) ABSTRACT

Disclosed is a periodic broadcasting of data packets in an ad hoc network formed by a plurality of mobile nodes that can move along traffic lanes forming junctions and can be located. A data packet is broadcast by a broadcaster node elected from a set of candidate nodes at each junction. The broadcaster node is elected in a decentralized manner at each candidate node by comparing the estimated travel time to reach the center of the junction with a particular reference time period between two successive broadcasts.

12 Claims, 8 Drawing Sheets

(56) References Cited

U.S. PATENT DOCUMENTS

| | | | |
|---|---|---|---|
| 2006/0045065 A1* | 3/2006 | Kim et al. | 370/351 |
| 2006/0193315 A1* | 8/2006 | Sinivaara et al. | 370/389 |
| 2006/0235967 A1 | 10/2006 | Fritz | |
| 2007/0035416 A1* | 2/2007 | Tanaka et al. | 340/906 |
| 2008/0186206 A1* | 8/2008 | Reumerman | 340/902 |

OTHER PUBLICATIONS

G. Kormaz et al., "Urban Multi-Hop Broadcast Protocol for Inter-Vehicle Communications Systems", Vanet '04, pp. 76-85, Oct. 1, 2004, XP002481596.

* cited by examiner

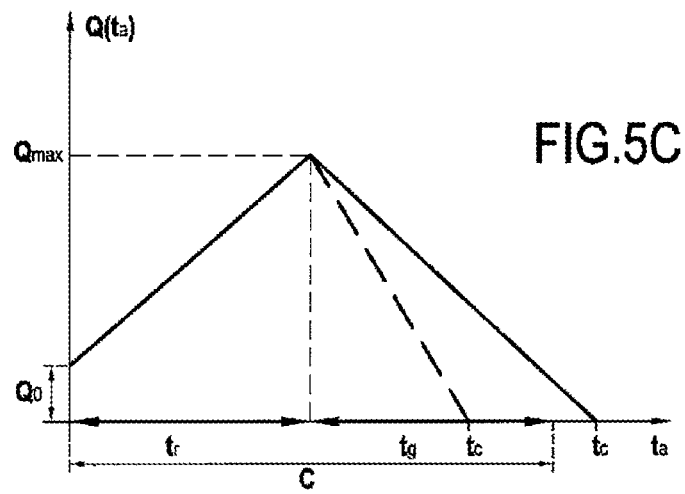
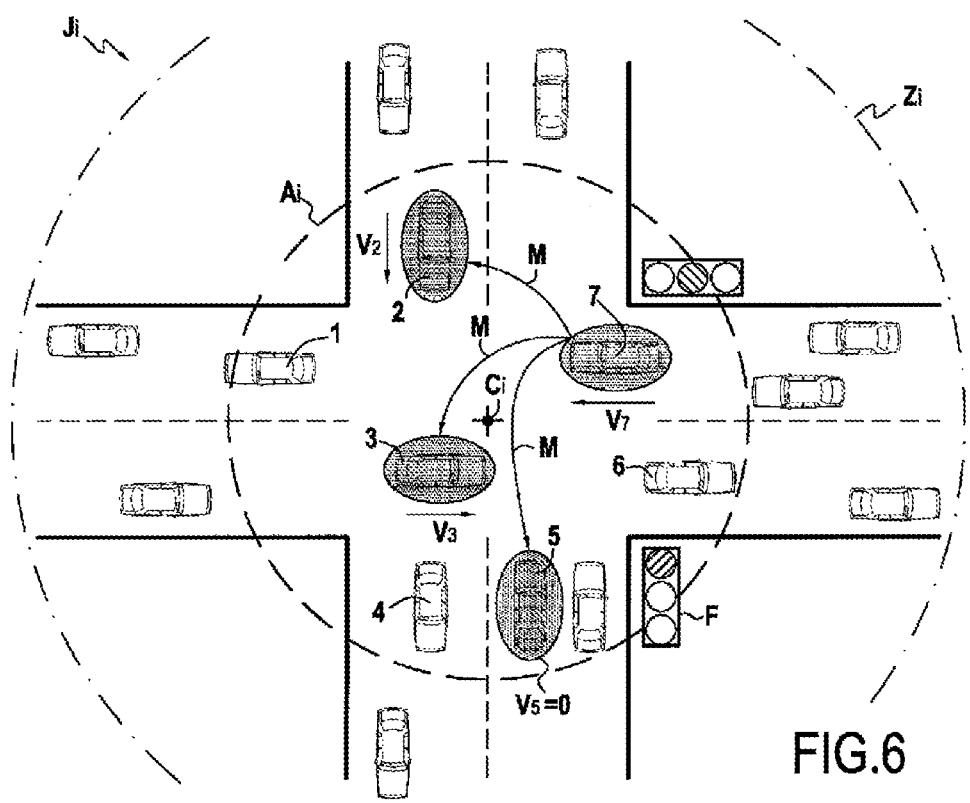

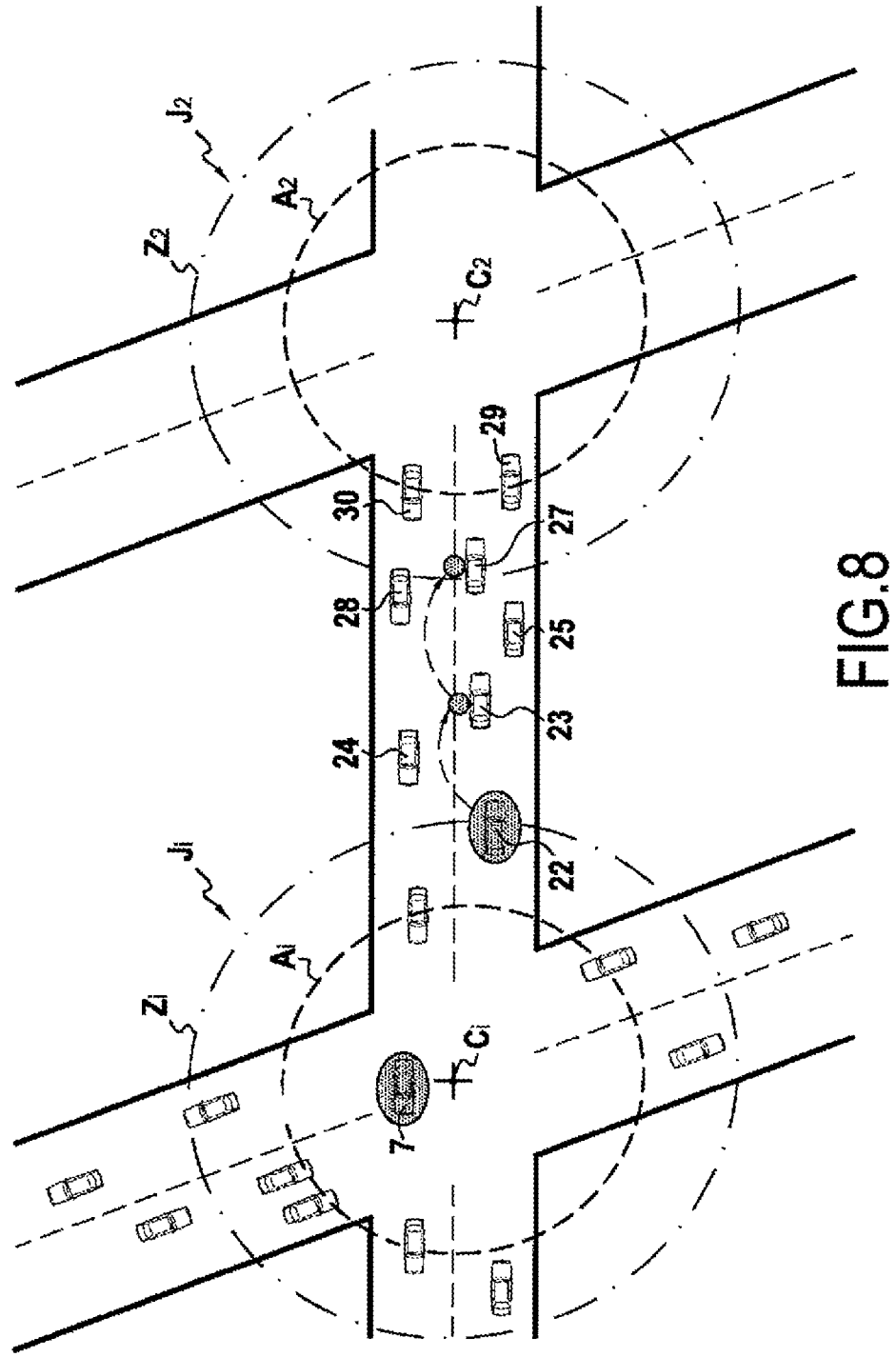

METHOD OF BROADCASTING DATA PACKETS IN A NETWORK OF MOBILE NODES AND ASSOCIATED TERMINAL

RELATED APPLICATIONS

This is a U.S. National Phase Application under 35 USC §371 of International Application PCT/FR2008/051881, filed on Oct. 17, 2008.

This application claims the priority of French application Ser. No. 07/58615 filed on Oct. 26, 2007, and the content of which is hereby incorporated by reference.

BACKGROUND OF THE INVENTION

The field of the invention is that of ad hoc communications networks.

The invention relates more precisely to broadcasting information in an ad hoc network formed dynamically by a plurality of communicating mobile nodes moving on traffic lanes of a particular geographical network in which each node can be located.

The invention finds a preferred but non-limiting application in vehicular ad hoc networks (VANETs), in which each communication node consists of a vehicle moving along traffic lanes of a road network, in particular in urban environments.

Broadcasting information in this type of network has many applications, such as broadcasting information relating to road traffic for intelligent transportation systems in order to improve driver safety and comfort.

In a paper entitled "Urban multihop broadcast protocol for inter-vehicle communications systems" published in VANET '04: Proceedings of the 1st ACM International Workshop on Vehicular Ad Hoc Networks, Philadelphia, Pa., USA: ACM Press, September 2004, pp. 76-85, G. Korkmaz, E. Ekici, F. Özgüner, and U. Özgöner describe a multihop protocol for broadcasting data packets for an inter-vehicular communications system suitable for an urban environment.

That protocol uses a combination of two types of packet broadcasting: local broadcasting at each junction and directional broadcasting between two successive junctions.

It provides for the use of fixed repeaters placed at each junction to transfer data packets to the nodes located at a junction during local broadcasting. When a node conveying a packet sent by the repeater leaves a junction and enters a traffic lane, it participates in directional broadcasting. During directional broadcasting, the node conveying the packet sends the packet to its most distant neighbor node, which becomes a sender node and in turn sends the packet to its most distant neighbor, without using information relating to the topology of the network.

A drawback of this type of approach is that it requires the installation of fixed repeaters at each junction. This is laborious and can be costly, especially if the road network covered by the ad hoc inter-vehicular network is very large.

OBJECT AND SUMMARY OF THE INVENTION

The present invention enables the drawbacks referred to above to be alleviated, by proposing a method of broadcasting at least one data packet in a network formed by a plurality of mobile nodes adapted to move in a geographical space.

The method includes a step of local broadcasting in a predetermined area of the geographical space, called a cell, during which step said at least one data packet is broadcast to the mobile nodes present in the cell.

According to an embodiment of the invention, the method further includes:

a step of receiving said at least one data packet;

a selection step during which the mobile node determines whether it is a candidate for broadcasting the data packet in the cell; and a step of electing the candidate node as broadcaster node of the data packet in the cell as a function of an estimated travel time of the candidate node to the center of the cell.

The local broadcasting step is carried out when the broadcaster node is located in the vicinity of the center of the cell.

Firstly, the step of broadcasting by a broadcaster node previously elected and located near the center of a cell enables emulation of a standard infrastructure, avoiding the installation and maintenance of equipment (repeaters) for broadcasting data packets. An elected node broadcasting a data packet to all its neighbor nodes located in the vicinity of the center of a cell temporarily assumes the role of a repeater installed at the center of that cell.

Thus a cell can be seen as a broadcast area that can be activated by a broadcaster node, this area becoming active when a candidate node is elected as the broadcaster node for that cell and when there are nodes receiving the packet located inside that area.

Electing the broadcaster node as a function of the estimated travel time enables a cell to be activated at regular time intervals and consequently periodic broadcasting of the data packet.

Thus the present invention provides a solution for broadcasting data packets in an ad hoc network at the level of a set of predefined geographical areas, which solution is easy to put into practice, of relatively low cost, and flexible in terms of deployment. The present invention enables decentralized broadcasting of data packets, without requiring exchange of location information between nodes of the network.

Furthermore, electing a broadcasting node at cell level enables a single node to be designated as being responsible for broadcasting the data packets in a geographical area, thus avoiding unnecessary overloading of the bandwidth of the ad hoc network by multiple transmissions.

According to another embodiment of the present invention, during said selection step, the mobile node determines that it is a candidate for broadcasting the data packet provided that it is moving towards the center of the cell and that it is located in an anchor area centered on the center and included in the cell.

By autonomously determining a waiting time that is specific to it, each candidate node participates in an election process that is effected in a distributed, decentralized manner, thus avoiding the installation of any infrastructure. This is particularly advantageous for deploying new broadcasting areas across an extensive geographical network.

According to another embodiment of the present invention, during the election step:

the candidate node calculates a waiting time, the value of the calculated waiting time decreasing as the estimated travel time of the candidate node to the center of the cell approaches a predetermined reference time period; and at the end of the waiting time the candidate node broadcasts a notification message reporting that it has been elected broadcaster node if it has not received any such notification message from another node.

Thus the broadcaster node elected at the level of a cell corresponds to the candidate node likely to reach the center of the cell in a time period that is as close as possible to the reference time period.

The predetermined reference time period advantageously corresponds to the required period of the local broadcasting step.

The data packet is therefore broadcast at the end of a time period close to the reference time period, thus ensuring periodic local broadcasting of the data packet at the level of each cell.

According to another embodiment of the present invention, the cell is defined by a radius equal to the transmission range of a mobile node and the anchor area is defined by a radius equal to half the transmission range of a mobile node.

A candidate node that has just been elected as a broadcaster node and is at the periphery of the anchor area can advantageously communicate with all the nodes located in that anchor area, and in particular with those located at the periphery of the anchor area and diametrically opposite the elected node. Thus a candidate node can be elected as a broadcaster node provided that the distance that separates it from the center of the cell is less than or at most equal to half the transmission range of a mobile node, the anchor area having a diameter equal to that transmission range.

According to another embodiment of the present invention, during the election step, a candidate node effects the following sub-steps:
  estimating the travel time necessary to reach the center of the cell;
  calculating a probability of being elected broadcaster node at the level of the cell, the probability calculation being adapted so that the probability of being elected increases as the estimated travel time to reach the center of the cell approaches the reference time period; and
  calculating the waiting time as a function of the probability of being elected, the waiting time calculation being adapted so that the waiting time decreases as the probability of being elected increases.

Electing a node for which the estimated travel time to reach the center of the cell is as close as possible to the broadcasting period ensures that when the elected node broadcasts the packet it is in the vicinity of the center of the cell.

According to another embodiment of the present invention, the probability of being elected as a function of the estimated travel time is determined from a Gaussian function having an expectation equal to the reference time period.

This function enables a maximum probability to be obtained for a candidate node for which the estimated travel time to reach the center of the cell corresponds to the reference time period and a probability that decreases as the absolute value of the difference between the estimated travel time and the reference time period increases.

According to another embodiment of the present invention, the waiting time WT is determined as a function of the probability of being elected, from the following formula:

$$WT(P_i) = WT_{Max}(1 - P_i/P_{max}) + \gamma_i$$

in which $WT_{max}$ designates the maximum waiting time that can be allocated to a mobile node, $P_i/P_{max}$ designates the normalized probability of being elected, and $\Delta_i$ is a number generated randomly.

The waiting time therefore decreases as the normalized probability approaches 1. The number $\Delta_i$ generated randomly advantageously enables different waiting times to be assigned to candidate nodes that have calculated exactly the same probability value, especially if the estimated waiting times are strictly equal or of the following form: $\Delta t = T \pm x$ where x is a real number designating a time offset value relative to the reference time period T.

According to another embodiment of the present invention, the geographical space is a traffic network comprising a plurality of traffic lanes forming between them a plurality of junctions, and said cell is associated with a junction.

The method of the invention is particularly suitable for dense and extensive road networks comprising a large number of junctions at which data packets must be broadcast. It is particularly advantageous to position an anchor point at the center of each junction so as to form a broadcasting area at each junction. In urban areas, the concentration of vehicles (mobile nodes) is generally the most dense at a junction that most vehicles must cross.

With the above-described broadcasting method being implemented in a decentralized manner at each node, another aspect of the present invention provides a mobile node of a network comprising a plurality of communicating mobile nodes.

Each mobile node includes:
  receiver means adapted to receive at least one data packet; and
  broadcaster means adapted to broadcast said at least one data packet to mobile nodes located inside a range area of the node concerned.

According to the present invention, the mobile node further includes:
  selection means adapted to determine whether said mobile node is a candidate for broadcasting said data packet in a predetermined area of a geographical space called a cell associated with said network;
  election means adapted to elect the candidate node as broadcaster node intended to broadcast said at least one data packet in the cell as a function of an estimated travel time of the candidate node to the center of the cell; and
  activation means adapted to activate the broadcasting means when said broadcaster node is located in the vicinity of the center of the cell.

According to another embodiment of the present invention, the selection means are adapted to determine that the mobile node is a candidate for broadcasting the data packet if the mobile node is moving towards the center of the cell and is located in an anchor area centered on the center and included in the cell.

According to another embodiment of the present invention, the terminal further includes:
  estimation means for estimating the travel time necessary to reach the center of the cell;
  first calculation means for calculating a probability of being elected broadcaster node at the level of the cell, the first calculation means being adapted to calculate a probability that increases as the estimated travel time to reach the center of the cell approaches the reference time period; and
  second calculation means for calculating a waiting time as a function of the probability of being elected, the second calculation means being adapted to calculate a waiting time that decreases as the probability of being elected increases.

Thus the second calculation means enable a waiting time to be calculated that decreases as the estimated travel time of the candidate node to reach the center of the cell approaches the predetermined reference time period.

According to another embodiment of the present invention, the first calculation means are adapted to determine the probability of being elected as a function of the estimated travel time determined by a Gaussian function having an expectation equal to the reference time period.

According to another embodiment of the present invention, the second calculation means are adapted to determine the waiting time as a function of the probability of being elected from the following formula:

$$WT(P) = WT_{Max}(1 - P/P_{max}) + \gamma$$

where $WT_{Max}$ designates the maximum waiting time that can be allocated to a mobile node, $P/P_{max}$ designates the normalized probability of being elected, and γ is a number generated randomly.

Another aspect of the present invention is directed to a wireless communications system including a plurality of mobile nodes moving on traffic lanes of a particular traffic network, wherein each node is a mobile node according to an embodiment of the present invention as defined above.

Alternatively, the steps of the data packet broadcasting method described above are determined by computer program instructions.

Consequently, another aspect of the invention provides a computer program executed on processor means (a processor) of a terminal, the program including instructions for executing the steps of the above data packet broadcasting method when that program is executed by a computer.

This program may use any programming language and take the form of source code, object code or a code intermediate between source code and object code, such as a partially-compiled form, or any other desirable form.

Another aspect of the invention provides a computer-readable storage medium storing a computer program including instructions for executing the steps of the above data packet broadcasting method when said program is executed on a computer and more particularly on processing means (a processor) of a wireless communications terminal.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which can be routed via an electrical or optical cable, by radio or by other means. The program of the invention can in particular be downloaded over an Internet-type network.

Alternatively, the information medium may be an integrated circuit incorporating the program, the circuit being adapted to execute the data packet routing method of the invention or to be used in its execution.

BRIEF DESCRIPTION OF THE DRAWINGS

Other features and advantages of the present invention emerge from the description given below with reference to the appended drawings, which show one non-limiting embodiment of the invention and in which:

FIG. 5C shows in graph form the number of mobile nodes in a queue in a peripheral area of a junction as a function of the arrival time of a node;

FIG. 6 shows diagrammatically an example of a scenario in which a broadcaster node is elected at a junction;

FIG. 8 shows diagrammatically the broadcasting of the data packet between two successive junctions during the directional propagation step.

DETAILED DESCRIPTION OF ONE
EMBODIMENT OF THE INVENTION

The present invention is described in detail below in the context of a vehicular ad hoc network (VANET) formed by a plurality of mobile nodes moving in a geographical space consisting of a road network in an urban area.

Figure 1:
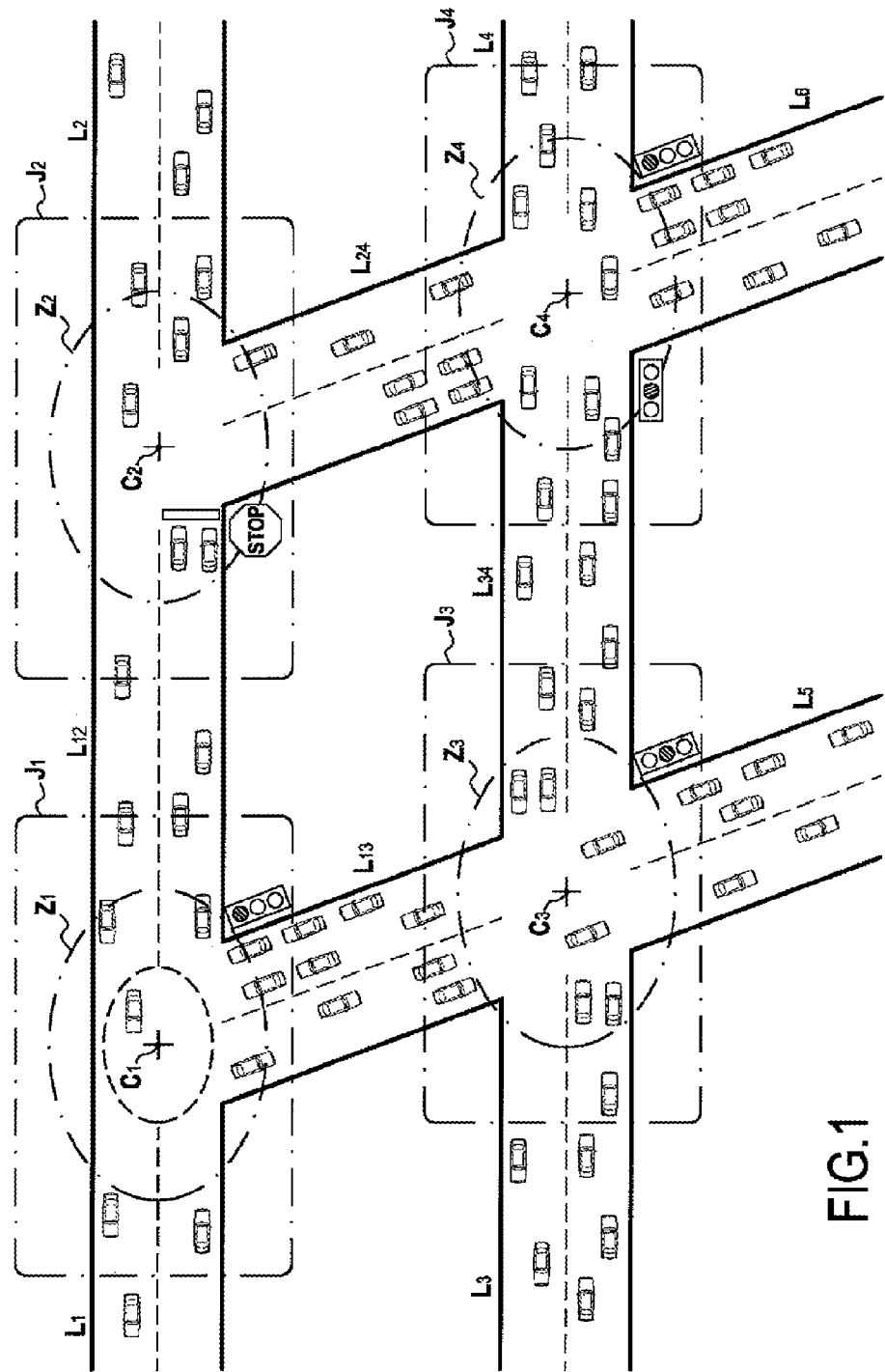
FIG. 1 shows diagrammatically an urban road network across which the nodes of an ad hoc network travel and in which the present invention is implemented.

FIG. 1 represents diagrammatically a road network comprising a plurality of traffic lanes $L_1, L_{12}, L_{13}, L_{2r}, L_3, L_{34}, L_{24}, L_4, L_s, L_6$ forming between them a plurality of junctions $J_1, J_2, J_3, J_4$. In this illustrative example, the traffic lanes are shown straight. However, the present invention applies to any road network configuration including curved traffic lanes with any angle between them.

Each mobile node that is a member of the vehicular ad hoc network consists of a vehicle able to move along the traffic lanes $L_1, L_{12}, L_{13}, L_2, L_3, L_{34}, L_{24}, L_4, L_5, L_6$ and across the junctions $J_1, J_2, J_3, J_4$ of the road network.

Each node can be located within the road network at any time. For this purpose, each vehicle is equipped with a conventional satellite navigation device including at least:

a receiver, for example of the GPS (Global Positioning System) or Galileo type, for obtaining its own geographical coordinates at any time; and a digital road map representing the road network and coupled to the GPS receiver to display the instantaneous position of the mobile node on the road map.

In a different embodiment, it is possible to envisage transmitting this location information to the mobile node by means of dedicated equipment of the network.

Each node is equipped with a wireless communications terminal, for example a WiFi™ transceiver, so that each node is able to communicate with its neighbor nodes using the IEEE 802.11 protocol. In particular, the communications terminal is able to broadcast data packets. Access to the communications channel is managed conventionally in accordance with the distributed coordination function (DCF) of the IEEE 802.11 protocol.

The wireless communications terminal onboard the mobile node can of course employ any other wireless technology, for example infrared technology.

Below, when referring to a reference node, the expression "neighbor node" refers to any node located within the transmission range of the reference node. For example, the transmission range of a mobile node is defined by a radius set at 250 meters (m) in accordance with the recommendations of the DSRC (Dedicated Short Range Communications) standard.

As shown in FIG. 1, a virtual anchor point $C_1$, $C_2$, $C_3$, $C_4$ with fixed geographical coordinates is defined at the center of each junction $J_1$, $J_2$, $J_3$, $J_4$, respectively. Each virtual anchor point $C_1$, $C_2$, $C_3$, C4 can be identified by any mobile node by means of its navigation device. In particular, on approaching a virtual anchor point, each node is able to determine the distance that separates it from that virtual anchor point from its own instantaneous geographical coordinates and those of the virtual anchor point.

A coverage cell $Z_1$, $Z_2$, $Z_3$, $Z_4$ with a radius equal to the transmission range of a mobile node (R=250 m) is defined at each junction $J_1$, $J_2$, $J_3$/$J_4$ so that the center of a coverage cell coincides with a virtual anchor point $C_1$, $C_2$, $C_3$, $C_4$. Thus below, the expression "virtual anchor point" refers to the center of a coverage cell. Each coverage cell $Z_1$, $Z_2$, $Z_3$, $Z_4$ defines a local broadcasting area in which a data packet is broadcast by a broadcaster node at periodic broadcasting times.

The reference time period T between two successive broadcasting times is determined beforehand at each virtual anchor point. In this example, it is assumed that the reference time period T is the same for all the virtual anchor points, so that each data packet is broadcast at each junction with the same period.

Figure 2:
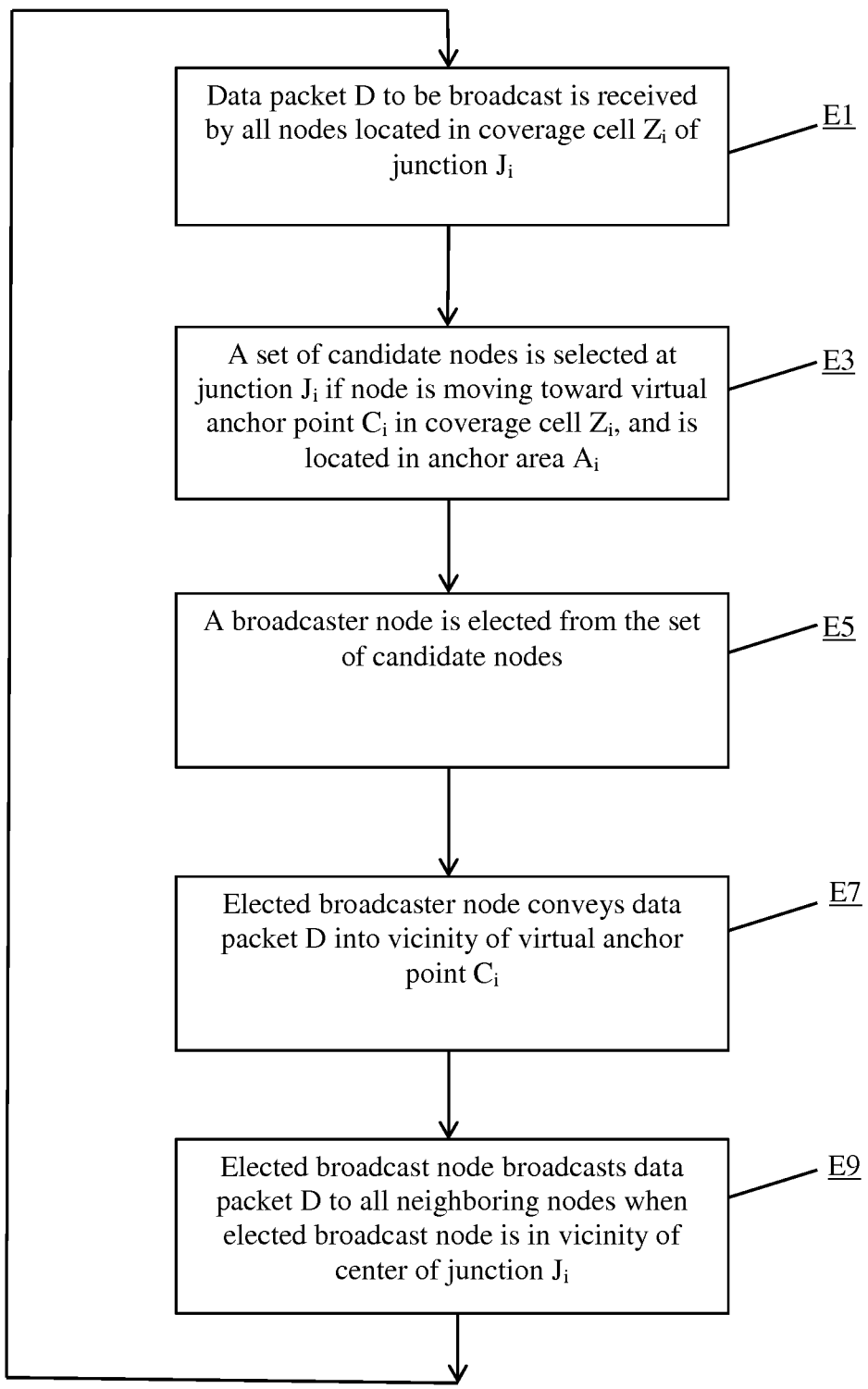
FIG. 2 shows in flowchart form the steps of the method of the invention used for the local broadcasting of a data packet at a junction of the road network.

The steps of the method of the invention executed for the local broadcasting of a data packet D at a junction $J_i$ are described below with reference to FIGS. 2 and 3.

During a receiving step $E_1$, a data packet D to be broadcast is received by all the nodes located in the coverage cell $Z_1$ of the junction $J_i$.

In this example, it is assumed that the data packet D is initially inserted into the ad hoc network by a fixed broadcasting station (not shown) installed at the side of a traffic lane. This station is located at an entry point into an urban area, for example, so that nodes entering that area convey the data packet D towards junctions.

During a selection step $E_3$, a set of candidate nodes 2, 3, 5, 7 for election as a broadcaster node is selected at the junction $J_i$, the function of the broadcaster node being to broadcast the data packet D in the coverage cell $Z_i$.

During the selection step $E_3$, each node conveying the data packet D is assigned the candidate node status provided that it is moving towards the virtual anchor point $C_i$ and is located in an anchor area $A_i$ included in the coverage cell $Z_i$ following reception of the data packet D during the receiving step B.

Figure 3:
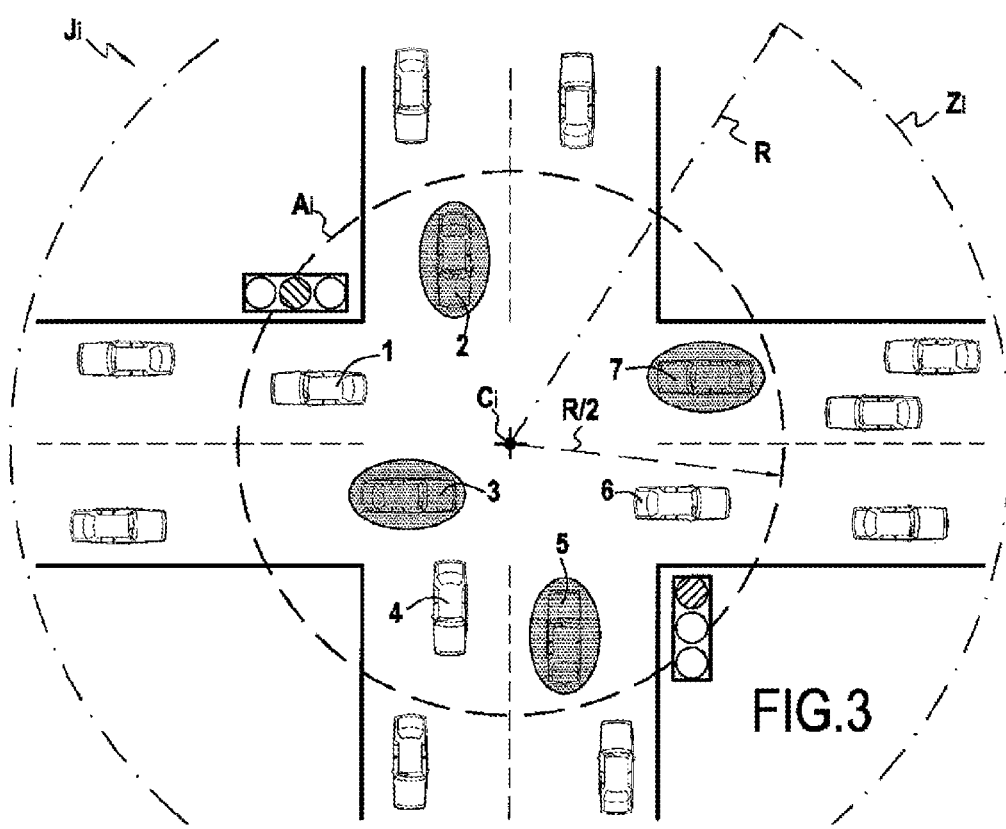
FIG. 3 shows diagrammatically an example of a scenario conforming to the present invention in which a set of candidate nodes is selected for the election of a broadcaster node at a junction.

By definition, the anchor area $A_i$ is an area centered on the virtual anchor point $C_i$ and defined by a radius R/2 equal to half the radius R of the coverage cell $Z_1$, i.e. half the transmission range of a mobile node (R/2=125 meters), as shown in FIG. 3.

Accordingly, on receiving the data packet D, each node conveying the data packet D determines whether it is located in the anchor area $A_i$. For this purpose, it uses its navigation device to verify whether the distance that separates it from the virtual anchor point $C_i$ is less than R/2 (half the transmission range of a node). If the verification result is positive, the node uses its navigation device to determine whether it is moving towards the virtual anchor point $C_i$. If so, the node is assigned the candidate node status. This applies to the nodes 2, 3, 5, 7 located in the anchor area $A_i$, as shown in FIG. 3. The nodes 1, 4, 6 are discarded as candidate nodes because, even though they are located in the anchor area $A_i$, they are moving away from the virtual anchor point $C_i$.

Each node is advantageously adapted to determine autonomously if it is a candidate for election as a broadcaster node. Thus candidate nodes are selected in a totally distributed manner at each node, without requiring the exchange of information between the nodes or any centralized infrastructure element.

During an election step $E_5$, a broadcaster node 7 is elected from all the candidate nodes 2, 3, 5, 7 determined beforehand during the selection step $E_3$. This election is effected by comparing the estimated travel time to reach the virtual anchor point $C_i$ and the particular reference time period T between two successive broadcasting times at the virtual anchor point.

Electing the broadcaster node 7 for broadcasting the data packet D in the coverage cell $Z_i$ at a given time advantageously makes it possible to optimize the use of the bandwidth of the ad hoc network, avoiding a plurality of nodes broadcasting the same data packet D simultaneously in the same coverage cell $Z_i$. During a conveying step $E_7$ the broadcaster node previously elected conveys the data packet D into the vicinity of the virtual anchor point $C_i$.

During a local broadcasting step $E_9$, when it is in the vicinity of the center of the junction $J_i$, the elected broadcaster node broadcasts the data packet D to all its neighbor nodes, so that all the nodes in the coverage cell of the junction at this time receive the data packet D.

Figure 4:
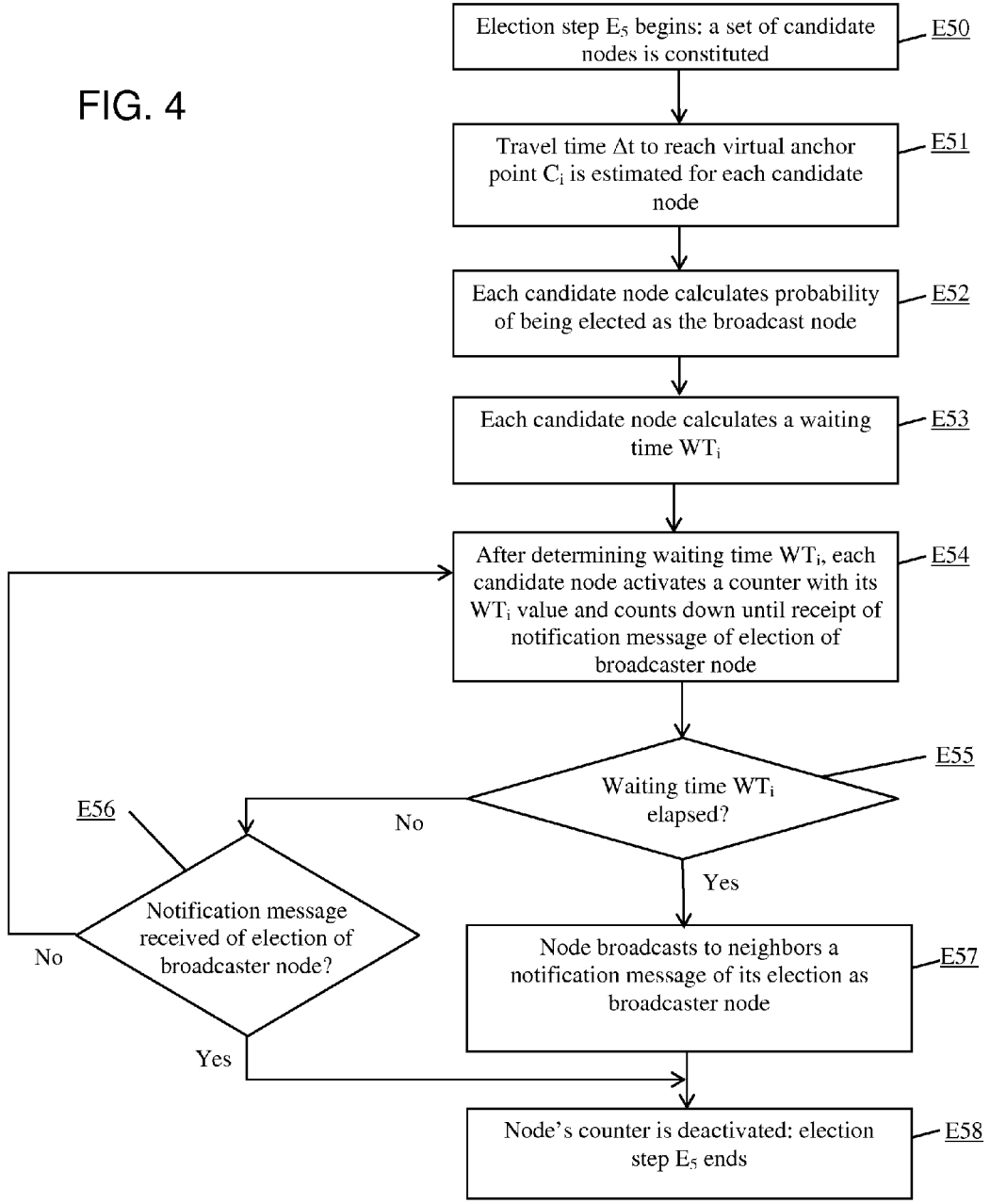
FIG. 4 shows in flowchart form the steps of the method of the invention used to elect a broadcaster node at a junction from the selected candidate nodes.

The step $E_5$ of electing the broadcaster node 7 is described in detail below with reference to FIGS. 4, 5, 6. This election step $E_5$ comprises a set of sub-steps described with reference to FIG. 4 and executed independently by each candidate node 2, 3, 5, 7 selected beforehand during the selection step $E_3$.

The election step $E_5$ begins when a set of candidate nodes 2, 3, 5, 7 is constituted (starting sub-step $E_{50}$ in the coverage cell $Z_1$.

During a first calculation sub-step $E_{51}$, each candidate node estimates a travel time $\Delta t$ necessary to reach the virtual anchor point $C_i$ such that:

$$\Delta t = \Delta t_w + \Delta t_m$$

where:
$\Delta t$ designates the waiting time of the node at the periphery of a junction; and
$\Delta t_m$ designates the time necessary to reach the center of the junction from the time at which the node has crossed the peripheral area of the junction, this time being calculated as a function of the speed of the node and the distance it has to travel to reach the center of the junction.

The waiting time $\Delta t_w$ caused by a traffic light in the peripheral area of a junction is calculated as a function of the arrival time $t_a$ of the node from the following expression (Expression 0):

$$\Delta t_W(t_a) = \begin{cases} \frac{Q_0}{s} + t_r - \left(1 - \frac{q}{s}\right) \times t_a & \text{if } 0 \le t_a \le \min(t_c, C) \\ 0 & \text{if } t_a > \min(t_c, C) \end{cases}$$

where:
$t_r$: is the duration of a stage during which the traffic light shows red (seconds);
$t_g$: is the duration of a stage during which the traffic light shows green (seconds);
C: is the duration of a cycle (seconds);
Q(t): is the length of the queue at the time t (number of vehicles);
$Q_0$: is the initial length of the queue (number of vehicles);
q: is the average rate of arrival at the traffic light (vehicles/s);
s: is the rate of departure from the traffic light (vehicles/s);
$t_a$: is the arrival time of the node at the traffic light (seconds);

$t_c$: is the time from which the queue is empty (seconds); and
$\Delta t_w(t)$: is the waiting time at time t (seconds)

The length of the queue Q(t) at time t is a plurality of vehicles determined from the function represented in graph form in FIG. 5C. As shown, a cycle of duration C consists of the following two stages:
- a first stage of duration $t_r$, during which the traffic light shows red and the number of vehicles in the queue increases;
- a second stage of duration $t_g$, during which the traffic light shows green and the number of vehicles in the queue decreases.

It is assumed that the queue is full ($Q_{max}$) when the traffic light changes from red to green (change of stage) and that the queue is empty at the time $t_c$.

If the queue empties before the traffic light changes to red, the queue is totally empty. In this situation, the time t, falls within the time period $t_g$ defining the second stage as shown in FIGS. 5C and $Q_0=0$ at the beginning of the next cycle. If not, $Q_0 \approx 0$.

The time $t_c$ is calculated from the following expression:

$$t_c = \frac{Q_0 + q \times t_r}{s - q}$$

To calculate the time $\Delta t_m$, using its navigation device, each candidate node calculates the distance that separates it from the virtual anchor point $C_i$ using its own geographical coordinates and those of the virtual anchor point. Using its navigation device, each candidate node then calculates the estimated travel time $\Delta t_m$ to reach the virtual anchor point $C_i$ as a function of its speed $v_i$ and the distance that separates it from the virtual anchor point $C_i$. Of course, the travel time $\Delta t_m$ decreases as the speed of the node increases and/or the distance that separates it from the virtual anchor point $C_i$ decreases.

Thus the candidate nodes 2, 3, 5, 7 in the FIG. 6 scenario determine autonomously their respective travel times $\Delta t_2$, $\Delta t_3$, $\Delta t_5$, $\Delta t_7$ as a function of their respective speed $v_2$, $v_3$, $v_5$, $v_7$ and their respective distances from the virtual anchor point $C_i$.

The particular situation is considered in which the nodes 2 and 7 estimate travel times that are "symmetrical" relative to the reference time period T, so that $\Delta t = Tx$ where x designates a real number; accordingly, for example: $\Delta t_2 = T+x$ and $\Delta t_7 = T-x$.

It is further assumed that at the time of obtaining the speed $v_5$ of the node 5, it is stopped at a traffic light F, so that its speed is zero ($v_5=0$) and consequently its estimated travel time $\Delta t_5$ is greater than that of the other nodes: $\Delta t_7 < \Delta t_2 \leq \Delta t_5$.

Finally, the mobile node 3 being the candidate node nearest the virtual anchor point $C_i$ and moving towards the point $C_i$ at a non-zero speed ($v_3>0$), its estimated travel time $\Delta t_3$ is short compared to that of the other nodes, such that: $\Delta t_3 \leq \Delta t_7 < \Delta t_2 < \Delta t_5$.

During a second calculation sub-step $E_{S2}$, using its navigation system, each candidate node calculates a probability of being elected broadcaster node. Each probability is determined as a function of the estimated travel time $\Delta t$ calculated during the first calculation sub-step $E_{S1}$ and as a function of the reference time period T.

Figure 5A:
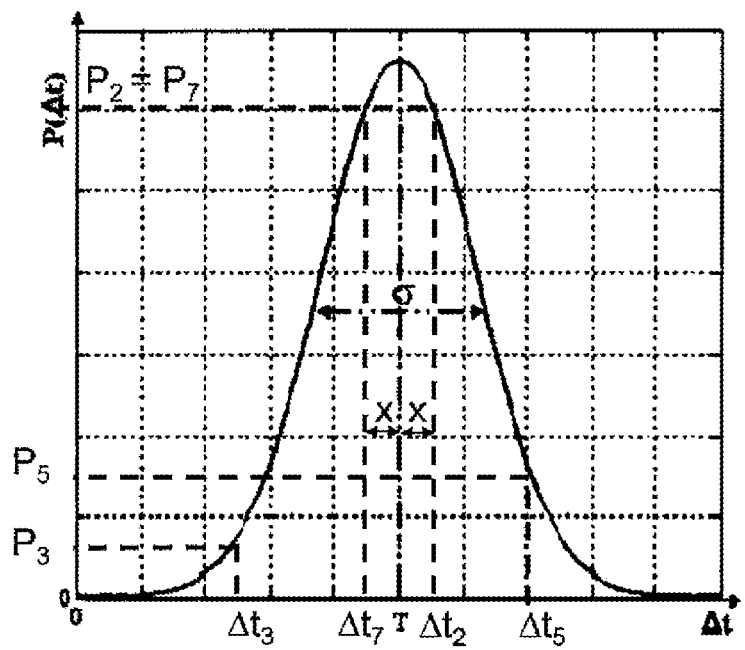
FIG. 5A shows in graph form a first example of the probability of electing a candidate node in the method of the present invention.

For this purpose, each candidate node 2, 3, 5, 7 calculates the probability P of being elected (respectively denoted $P_2$, $P_3$, $P_5$, $P_7$) as a function of its estimated travel time $\Delta t_i$ (respectively denoted $\Delta t_2$, $\Delta t_3$, $\Delta t_5$, $\Delta t_7$), for example by applying a standard Gaussian function represented in graph form in FIG. 5A and defined by the following expression (Expression 1):

$$P(\Delta t_i) \equiv P_i = \frac{1}{\sigma\sqrt{2\pi}} \exp\left(-\frac{1}{2}\left(\frac{\Delta t_i - T}{\sigma}\right)^2\right)$$

in which $\Delta t_i$ is the estimated travel time of the $i^{th}$ candidate node to reach the virtual anchor point $C_i$; $\sigma$ is a time constant corresponding to the mid-height temporal width of the Gaussian curve representing the function $P(\Delta t)$; and T corresponds to the average value of the function $P(\Delta t_i)$ and designates the reference time period between two successive broadcasting times at the anchor point $C_i$.

The value of the time constant $\sigma$ is defined as a function of the reference time period T and the required accuracy for electing the broadcaster node. The lower the value of this time constant, the more selective this selection. In the extreme situation where $\sigma=0$, the Gaussian curve becomes a Dirac pulse $\epsilon_T$, such that $\delta_T(T)=1$ and $\epsilon_T(T)=0$ for any $t \neq T$. In this situation, each broadcaster node is a candidate node for which the estimated travel time to reach the center of the cell corresponds precisely to the reference time period T. In practice, it is unlikely that there will be found in each broadcasting cycle a candidate node with an estimated travel time exactly equal to T. Consequently, the value of $\sigma$ is chosen to be non-zero and adjusted to enable a candidate node for which the estimated travel time is sufficiently close to T to be selected in each broadcasting cycle. The value of the reference time period T cannot exceed a maximum reference value $T_{max}$ that corresponds to the average travel time for crossing a junction at an average speed. Generally speaking, the value of T is chosen as a function of the type of application concerned. In particular, for broadcasting information relating to road safety, the reference time period T is made sufficiently short to take account of the ephemeral nature of the information broadcast.

In this example, the probability $P(\Delta t)$ of being elected is calculated using a Gaussian function. Obviously, the person skilled in the art could use any other function the maximum value of which is reached for $\Delta t = T$ and producing a probability value that decreases as the difference $|T-\Delta t|$ increases.

Figure 5B:
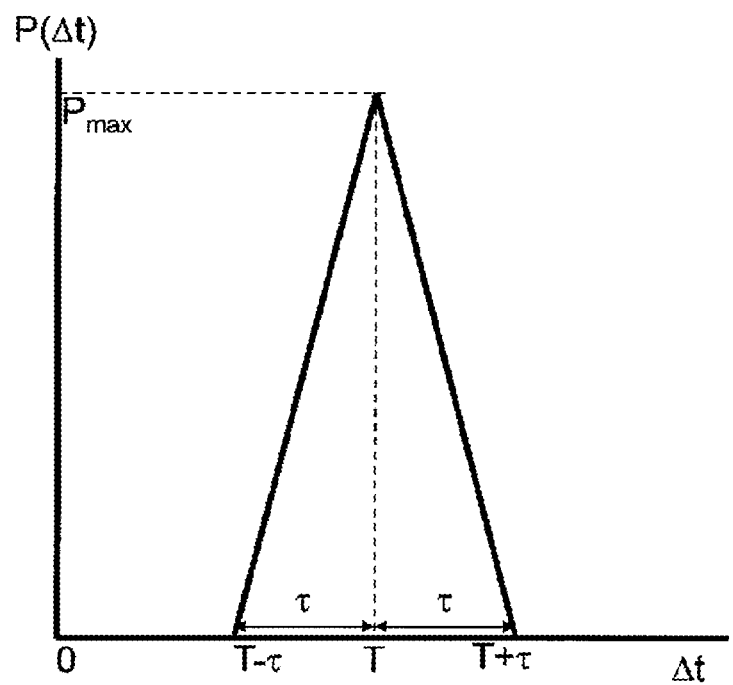
FIG. 5B shows in graph form a second example of the probability of electing a candidate node in the method of the present invention.

Accordingly, in a different embodiment, the probability P is determined according to a "triangle" function represented in graph form in FIG. 5B and defined by the following expression (Expression 2):

$$P \equiv P(\Delta t) = \begin{cases} 0 & \text{if } \Delta t \geq T + \tau \text{ or } 0 \leq \Delta t \leq T - \tau \\ \frac{P_{Max}}{\tau}\Delta t + P_{Max}\left(1 - \frac{T}{\tau}\right) & \text{if } T - \tau < \Delta t \leq T \\ -\frac{P_{Max}}{\tau}\Delta t + P_{Max}\left(1 + \frac{T}{\tau}\right) & \text{if } T \leq \Delta t < T - \tau \end{cases}$$

where $\tau$ is a real positive constant used to define the width of the triangle function as represented in FIG. 5B, $P_{Max}$ corresponds to the maximum probability such that $P_{Max}=P(T)=1/\tau$ so that the sum of all the probabilities is equal to 1, and T designates the reference time period.

In the situations represented in FIGS. 5A and 5B, the probability $P(\Delta t)$ of being elected increases as the estimated travel time £t to reach the virtual anchor point $C_i$ approaches the reference period T. In other words, the probability P decreases as the difference $|T-\Delta t|$ increases. This makes it possible to elect a broadcaster node for which the estimated travel time to reach the center of a coverage cell is commensurately closer to T.

Given that the candidate nodes 2 and 7 have estimated travel times $\Delta t_2 = Tx$ and $\Delta t_7 = T-x$, respectively, these candidate nodes 2 and 7 determine exactly the same probability of being elected: $P_2 = P(\Delta t_2) = P_7 = (\Delta t_7)$, as shown in FIG. 5A. Accordingly, the probabilities of being elected for the candidate nodes 2, 3, 5, 7 shown in FIG. 6 are such that $P_3 = (\Delta t_3) < P(\Delta t_5) < P_2 = P_7$ as shown in FIG. 5A.

During a third calculation sub-step $E_{53}$, using its navigation device, each candidate node calculates a waiting time $WT_i$ as a function of the probability of being elected obtained following the second calculation sub-step $E_{52}$. The waiting time $WT_i$ is determined from the following expression (Expression 3):

$$WT_i(P_i) = WT_{Max}\left(\frac{P_i}{P_{max}} - 1\right) + \gamma_i$$

in which $WT_{Max}$ is a real constant designating the maximum waiting time that can be assigned to a candidate node $WT_{Max} = WT_i(P_i = 0)$, $P_i/P_{max}$ designates the normalized probability of election of the $i^{th}$ candidate node, and $\gamma_i$ is a real number generated randomly.

The time $WT_i$ determined from Expression 3 decreases as the probability $P_i$ of being elected increases.

Using the number $\gamma_i$ has the advantage that it enables a plurality of nodes having exactly the same probability of being elected to calculate a different waiting time $WT_i$. This is precisely the situation of the nodes 2 and 7 that have calculated the same probability value $P_2 = P_7$, the random number $\gamma_i$ distinguishing them. For example, assuming that the random number $\gamma_2$ generated for the node 2 is greater than the random number $\gamma_7$ generated for the node 7 ($\gamma_7 \leq \gamma_2$), the nodes 7, 2 have different waiting times $WT_7$, $WT_2$ such that $WT_7 < WT_2$.

The candidate node 3 for which the probability $P(\Delta t_2)$ of being elected is the lowest ($P(\Delta t_3) < P(\Delta t_5) < P(\Delta t_2) = P(\Delta t_7)$) calculates from Expression 3 a high waiting time $WT_3$ such that $WT_3 > WT_5 > WT_2 > WT_7$.

As soon as the waiting time $WT_i$ has been determined, each candidate node 2, 3, 5, 7 activates a counter initialized with its value $WT_i$ and counts down from that value during a countdown step $E_{54}$ for as long as the node is not notified of the election of a broadcaster node.

For this purpose, during a test step $E_{55}$, each candidate node whose counter has been activated verifies that its waiting time $WT_i$ has not elapsed. If its waiting time has not elapsed, the node verifies during a verification step $E_{55}$ if it has received a notification message M indicating that a broadcaster node has been elected, which would signify that a candidate node with a shorter waiting time would already have been elected broadcaster node (step $E_{58}$). As long as no node has broadcast the data packet D and the waiting time $WT_i$ of a given node has not elapsed, that node repeats steps $E_{54}$, $E_{55}$, and $E_{56}$. If the node has received a notification message, the counter of that node is deactivated and the election step $E_5$ ends (sub-step $E_{55}$).

As soon as the waiting time $WT_i$ of a given node has elapsed, and if the data packet D has not been broadcast by any other node at that point, the node in question broadcasts to all its neighbor nodes a notification message M indicating that it has acquired broadcasting node status (step $E_{57}$), thereby marking the end of the election step $E_5$. Referring to FIG. 6, the candidate nodes 2, 3, 5 receive the notification message M informing them that the node 7 has been elected broadcaster node.

In the FIG. 6 example, the candidate node 7 having calculated the lowest waiting time ($WT_7 \leq WT_2 < WT_5 < WT_3$) is the first candidate node to broadcast the notification message M. Because of this it is elected broadcaster node 7. On receiving the notification message, the remaining candidate nodes 2, 3, 5 are informed that the node 7 has just been elected broadcaster node, which ends the election step $E_5$.

Note that, given that the candidate node 7 that has just been elected is at a distance from the virtual anchor point $C_i$ equal at most to half the transmission radius of a node, the node 7 can send the notification message M to all the nodes located in the anchor area $A_i$. In particular, if the node 7 were at the periphery of the anchor area A, at the time of election, i.e. at a distance equal to half the transmission range (R/2) of the virtual anchor center $C_i$, the center $C_i$ would have been able to inform candidate nodes located at the periphery of the anchor area $A_i$ and diametrically opposite the node 7. In the limit, the distance separating the elected broadcaster node 7 and the remaining candidate nodes would have been equal to the transmission radius of a node.

When the elected broadcaster node 7 arrives at the anchor point $C_i$ of the cell $Z_i$ it broadcasts the data packet D to all the neighbor nodes located in that cell.

The steps of the method described above are repeated so that an elected broadcaster node broadcasts the data packet D at regular time intervals. Each iteration defines a cycle during which the data packet is broadcast by a broadcaster node. Electing in each cycle a broadcaster node for which the estimated time to reach the center of a junction is as close as possible to the reference time period T emulates an infrastructure junction broadcasting the data periodically. Accordingly, the junction can be considered a broadcasting area within which the data is stationary.

To disseminate data across the whole of the road network it is necessary to transmit the data along traffic lanes that interconnect junctions. To this end, the present invention provides a progressive broadcasting stage for broadcasting data between two successive junctions during which a data packet is broadcast by a set of broadcaster nodes elected successively as the packet progresses along a traffic lane connecting the two successive junctions.

The directional propagation stage is started by mobile nodes conveying the data packet at a current junction and traveling in the direction of an adjacent junction, these conveying nodes having received the data packet D previously broadcast by a broadcaster node in a coverage cell.

Figure 7:
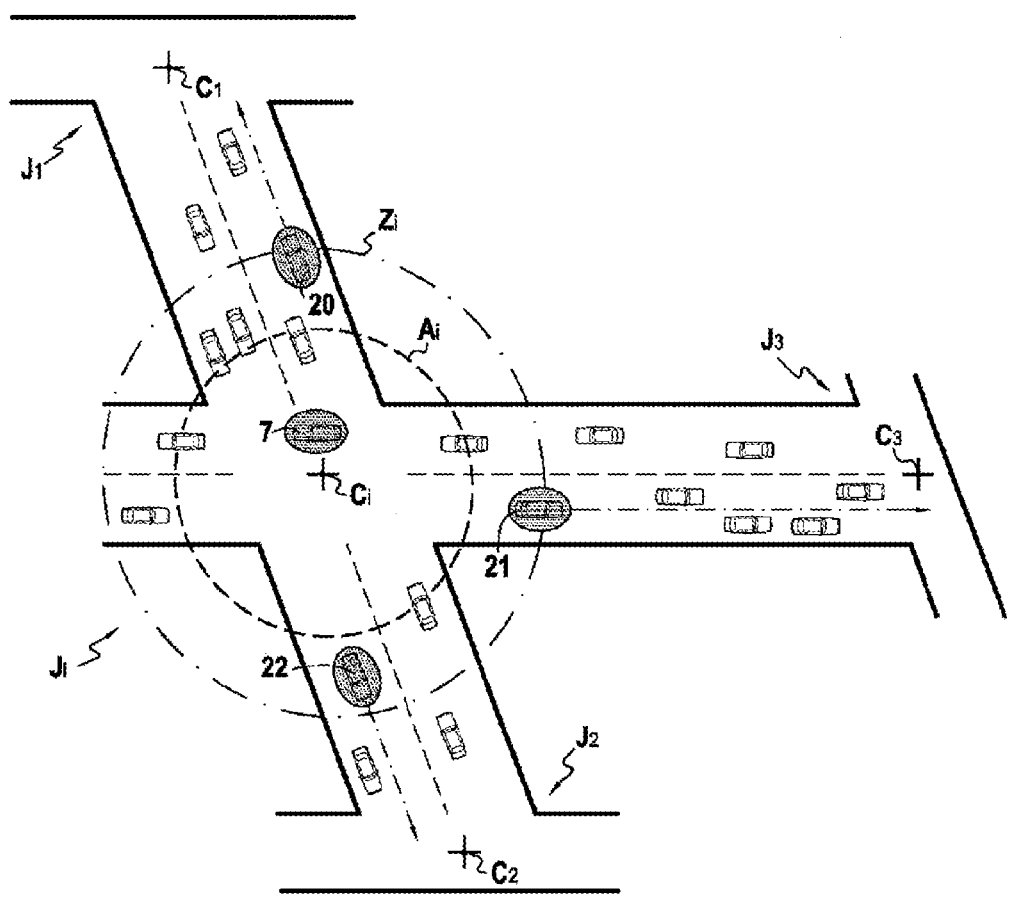
FIG. 7 shows diagrammatically an example of a scenario in which a data packet is broadcast by the broadcaster node elected at a junction and a step of directional propagation of the packet to neighbor junctions is started.

As shown in FIG. 7, the broadcaster node 7 located at the center of the junction $J_i$ has broadcast the data packet D to all its neighbors, and in particular to the peripheral mobile nodes 20, 21, 22 located at the periphery of the coverage cell $Z_i$ and respectively moving towards an adjacent junction $J_1$, $J_3$, $J_2$. Transferring the data packet to the peripheral nodes 20, 21, 22 starts the stage of directional propagation to each neighbor junction.

As shown in FIG. 8, the data packet D is broadcast progressively along the traffic lane connecting two successive junctions $J_i$ and $J_2$ by broadcaster nodes 22, 23, 27 elected successively during the directional propagation stage.

The directional propagation stage enabling propagation of the data packet from the junction $J_i$ to the junction $J_2$ is executed in accordance with broadcasting algorithms known to the person skilled in the art.

The wireless communications terminal of each mobile node includes sending and receiving means enabling each node to broadcast and receive the data packets D and the notification messages M.

The navigation device onboard each mobile node includes processor means (a processor) adapted to effect autonomously and in a decentralized manner the steps and sub-steps relating to the election of a broadcaster node described above.

The navigation device includes software means (selection means) able to determine whether the node associated with the navigation device is a candidate for broadcasting the data packet. If so, further software means (election means) included in the navigation device determine whether that node has been elected broadcaster node. If the node is elected broadcaster node, further software means (activation means) included in the navigation device activate the sending means of the associated communications terminal if the navigation device detects that the node is in the vicinity of the center of the cell.

In particular, the above mathematical Expressions 0, 1, 2, 3 are programmed and saved in a memory of the onboard navigation device and then executed by processor means (a processor) associated with the node.

INDUSTRIAL APPLICATIONS

In a first application example, the broadcasting method of the invention disseminates traffic condition information used to optimize the calculation of the route of a vehicle.

In a second application example, the broadcasting method of the invention indicates to a driver in real time parking spaces available around their current position. It is assumed that the available spaces are identified in a station that periodically broadcasts this information that is disseminated across the junctions by the vehicles (mobile nodes).

In a third application example, the broadcasting method of the invention is used on a motorway segment to disseminate road safety information in a geographical area in which an event (accident, roadworks) is taking place that entails traffic modifications (traffic slowing, diversions) for the drivers. In this situation, a data packet constituting an alert message is generated manually or automatically at the site of the event. This data packet is propagated from this point to the adjoining junctions, where the packet is broadcast at regular time intervals by the broadcasting method of the invention. In this way, each vehicle (mobile node) traveling through the junctions is alerted on receiving the data packet as it enters the alert area.

The invention claimed is:

1. A method of broadcasting at least one data packet in a network formed by a plurality of mobile nodes adapted to move in a geographical space, said method comprising:
    local broadcasting in a predetermined area of said geographical space, called a cell, during which said at least one data packet is broadcast to the plurality of mobile nodes present in said cell, wherein said cell is defined by a virtual anchor point having fixed geographical coordinates and corresponding to the center of said cell;
    receiving said at least one data packet;
    performing a selection during which each of the plurality of mobile nodes determines whether it is a candidate for broadcasting said at least one data packet in said cell; and
    electing a candidate node from among the plurality of mobile nodes as broadcaster node of said at least one data packet in said cell as a function of an estimated travel time of said candidate node to the center of said cell, said candidate node being elected as the broadcaster node when it is estimated to be the first to reach the center of the cell;
    wherein said candidate node broadcasts a notification message reporting that it has been elected as the broadcaster node if it has not received any such notification message from another node; and
    wherein said local broadcasting step is carried out when said broadcaster node is located in the vicinity of the center of said cell.

2. The method according to claim 1, wherein, during said selection-step, each of the plurality of mobile nodes determines that it is a candidate for broadcasting said at least one data packet provided that it is moving towards the center of said cell and that it is located in an anchor area centered on said center and included in the cell.

3. The method according to claim 1, wherein, during said election-step, said candidate node calculates a waiting time, the value of the calculated waiting time decreasing as the estimated travel time of said candidate node to the center of said cell approaches a predetermined reference time period, and wherein at the end of said waiting time said candidate node broadcasts the notification message reporting that it has been elected as the broadcaster node if it has not received any such notification message from the another node.

4. The method according to claim 3, wherein the predetermined reference time period corresponds to the period of said local broadcast.

5. The method according to claim 3, wherein the waiting time is further calculated as a function of a number generated randomly.

6. The method according to claim 1, wherein the geographical space is a traffic network comprising a plurality of traffic lanes forming between them a plurality of junctions, and wherein said cell is associated with a junction.

7. A mobile node of a network comprising a plurality of communicating mobile nodes, said mobile node including:
    a processor;
    a memory coupled to the processor;
    receiver means adapted to receive at least one data packet;
    broadcaster means adapted to broadcast said at least one data packet to a plurality of mobile nodes located inside a range area;
    said processor determining whether each of said plurality of mobile nodes is a candidate for broadcasting said at least one data packet in a predetermined area of a geographical space called a cell associated with said network, wherein said cell is defined by a virtual anchor point having fixed geographical coordinates and corresponding to the center of said cell;
    said processor electing the candidate node as broadcaster node intended to broadcast said at least one data packet in said cell as a function of an estimated travel time of said candidate node to the center of said cell, said candidate node being elected as the broadcaster node when it is estimated to be the first to reach the center of the cell;
    the broadcaster means broadcasting a notification message reporting that said candidate node has been elected as the broadcaster node, said broadcaster means being activated if said candidate node has not received any such notification message from another node; and
    said processor activating said broadcasting means when the broadcaster node is located in the vicinity of the center of said cell.

8. The mobile node according to claim 7, wherein said processor determines that said mobile node is a candidate for broadcasting said at least one data packet if said mobile node is moving towards the center of said cell and is located in an anchor area centered on said center and included in the cell.

9. The mobile node according to claim 7, wherein said processor calculates a waiting time, the calculated value of the waiting time decreasing as the estimated travel time of said candidate node to the center of said cell approaches a predetermined reference time period; and the broadcaster means broadcasts a notification message reporting that said candidate node has been elected as the broadcaster node, said broadcaster means being activated at the end of said waiting time if said candidate node has not received any such notification message from the another node.

10. A wireless communications system including a plurality of mobile nodes moving on traffic lanes of a particular traffic network, wherein at least one of the plurality of mobile nodes comprising:

a processor;
a memory coupled to the processor;
receiver means adapted to receive at least one data packet;
broadcaster means adapted to broadcast said at least one data packet to a plurality of mobile nodes located inside a range area;
said processor determining whether each of said plurality of mobile nodes is a candidate for broadcasting said at least one data packet in a predetermined area of a geographical space called a cell associated with said network, wherein said cell is defined by a virtual anchor point having fixed geographical coordinates and corresponding to the center of said cell;
said processor electing the candidate node as broadcaster node intended to broadcast said at least one data packet in said cell as a function of an estimated travel time of said candidate node to the center of said cell, said candidate node being elected as the broadcaster node when it is estimated to be the first to reach the center of the cell;
the broadcaster means broadcasting a notification message reporting that said candidate node has been elected as the broadcaster node, said broadcaster means being activated if said candidate node has not received any such notification message from another node; and
said processor activating said broadcasting means when the broadcaster node is located in the vicinity of the center of said cell.

11. A process which occurs as a result of executing a computer program on a computer, wherein said computer program, when executed on the computer, causes a processor to broadcast at least one data packet in a network formed by a plurality of mobile nodes adapted to move in a geographical space, the process comprising:

locally broadcasting in a predetermined area of said geographical space, called a cell, during which said at least one data packet is broadcast to a plurality of mobile nodes present in said cell, wherein said cell is defined by a virtual anchor point having fixed geographical coordinates and corresponding to the center of said cell;
receiving said at least one data packet;
performing a selection during which each of the plurality of mobile nodes determines whether it is a candidate for broadcasting said at least one data packet in said cell; and
electing a candidate node from among the plurality of mobile nodes as broadcaster node of said at least one data packet in said cell as a function of an estimated travel time of said candidate node to the center of said cell, said candidate node being elected as the broadcaster node when it is estimated to be the first to reach the center of the cell;
wherein said candidate node broadcasts a notification message reporting that it has been elected as the broadcaster node if it has not received any such notification message from another node; and
wherein said local broadcasting step is carried out when said broadcaster node is located in the vicinity of the center of said cell.

12. A non-transitory computer-readable storage medium encoded with a computer program executed by a computer that causes broadcast of at least one data packet in a network formed by a plurality of mobile nodes adapted to move in a geographical space, the computer program comprising:

program code for local broadcasting in a predetermined area of said geographical space, called a cell, during which said at least one data packet is broadcast to a plurality of mobile nodes present in said cell, wherein said cell is defined by a virtual anchor point having fixed geographical coordinates and corresponding to the center of said cell;
program code for receiving said at least one data packet;
program code for performing a selection during which each of the plurality of mobile nodes determines whether it is a candidate for broadcasting said at least one data packet in said cell; and
program code for electing a candidate node from among the plurality of mobile nodes as broadcaster node of said at least one data packet in said cell as a function of an estimated travel time of said candidate node to the center of said cell wherein said candidate node is elected as the broadcaster node when it is estimated to be the first to reach the center of the cell;
wherein said candidate node broadcasts a notification message reporting that it has been elected as the broadcaster node if it has not received any such notification message from another node; and
wherein said local broadcasting step is carried out when said broadcaster node is located in the vicinity of the center of said cell.

* * * * *